United States Patent Office 3,172,871
Patented Mar. 9, 1965

3,172,871
ESTERS AND AMIDES OF PHOSPHORUS ACID AS STABILIZERS FOR RUBBERY POLYMERS
Hugo Malz and Otto Bayer, Leverkusen, Ernst Roos and Wilhelm Gobel, Cologne-Flittard, and Heinz Gröne, Leverkusen, Germany, assignors to Farbenfabriken Bayer Aktiengesellschaft, Leverkusen, Germany, a corporation of Germany
No Drawing. Filed Feb. 24, 1961, Ser. No. 91,344
Claims priority, application Germany, Feb. 20, 1960, F 30,642; Feb. 26, 1960, F 31,710
11 Claims. (Cl. 260—45.9)

Synthetic rubber latices, solid rubbers and also finished products (vulcanisates) produced therefrom must be protected against external influences, such as oxidation, light and heat. For this purpose it is customary to employ stabilizers which can be added to the synthetic rubber at various stages in the processing thereof. Chlorine-containing compounds of relatively high molecular weight (e.g. polymers of vinyl chloride; copolymers of vinyl chloride and vinyl acetate; polyers and copolymers of vinylidene chloride; and chlorination products of higher or polymeric hydrocarbons, such as chlorinated paraffins and chlorinated natural and synthetic rubber) undergo undesired changes under the action of heat and light, mainly with HCl being split off. These changes can result, inter alia, in a deterioration of the mechanical properties and in a discolouration of products produced from such chlorine-containing compounds. In order to improve the properties of synthetic rubber and chlorine-containing compounds of relatively high molecular weight, it is necessary to add stabilizers thereto. A disadvantage of the prior known stabilizers for synthetic rubber is their limited applicability, the known stabilizers exerting a stabilizing action only on certain types of synthetic rubber. A second disadvantage of the known stabilizers for synthetic rubber is that many of them are objectionable from a physiological point of view. Many of the known stabilizers for synthetic rubber also have a strong discolouring action on the polymers.

Stabilizers for chlorine-containing polymers should be effective in the stabilization of as many of the aforementioned polymers as possible. They should also simultaneously stabilize the polymers against heat and light, not render the processing of the material difficult and be compatible with additives, such as plasticisers. The majority of the known stabilizers do not satisfy all of these requirements.

It has now been found that phosphorous acid esters of the general formula

wherein R, $R_1$ and $R_2$ have the meanings hereinafter specified, are excellent stabilizers for synthetic rubber and chlorinated polymers and are more generally applicable and more effective than the stabilizers hitherto employed.

In the aforementioned formula R and $R_1$, which may be the same or different, each represents an aliphatic, prefereably lower alkyl (up to 6 carbon atoms) or aromatic, preferably phenyl or lower alkyl phenyl radical, the alkyl group being preferably a lower alkyl group having up to 6 carbon atoms which is joined to the phosphorus atom through an oxygen or nitrogen atom; or R, $R_1$ and $R_2$ may be radicals of the formula

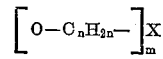

wherein $n$ is an integer from 1 to 4, $m$ an integer from 1 to 3 and X represents

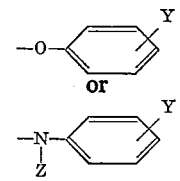

Y in the last two formulae representing a hydrogen atom, an alkyl, aryl, alkaryl or aralkyl radical and Z in the last formula representing a hydrogen atom or an alkyl, cycloalkyl, aryl, alkaryl or aralkyl radical. The alkyl groups are again preferably lower alkyl groups having up to 6 carbon atoms and the aryl groups are preferably phenyl and alkyl phenyl preferably lower alkyl phenyl groups.

The aforementioned compounds of the general formula

are novel compounds. They may readily be prepared by reacting phosphorus trichloride or the corresponding phosphorous acid ester dichloride or phosphorous acid diester monochloride with an hydroxyalkylated phenol or amine. The compounds are colorless to light brown odourless oils and the majority of them cannot be distilled with-out decomposition.

As previously mentioned, these novel compounds are suitable for stabilizing synthetic rubber and chlorinated polymers. They can, for example, be used for stabilizing (a) polymers derived from conjugated diolefines, such as butadiene, dimethyl butadiene, isoprene and homologues thereof; (b) copolymers of conjugated diolefines and polymerisable vinyl compounds, such as styrene, α-methyl styrene, acrylonitrile, methacrylonitrile, acrylates or methacrylates; (c) copolymers derived from iso-olefines (e.g. isobutylene or its homologues) and small quantities of conjugated diolefines; and (d) polymers derived from chlorobutadiene, and (e) copolymers of chlorobutadiene with mono-olefines and/or diolefines or polymerisable vinyl compounds. Examples of chlorine-containing polymers are polymers of vinyl chloride or vinylidene chloride and copolymers of these compounds with 2-chlorobutadiene or vinyl acetate, also chlorinated rubber or sulpho-chlorinated polyethylene. The new stabilizers can be admixed with the synthetic rubber latex or with rubber solutions and also with the solid rubber or the solid chorine-containing polymers (for example on a roller). In certain circumstances they can also be admixed with the monomers prior to polymerisation. The stalibizers should preferably be employed in an amount of from 0.1% to 10% by weight, based on the weight of the synthetic rubber or the chlorine-containing polymer. Amounts of stabilizer of from 0.5% to 5%, and especially from 0.5% to 1.5%, are particularly preferred. They impart to synthetic rubber and to chlorine-containing polymers excellent stability to oxidizing agents (e.g. atmospheric known stabilizer tris-nonyl phenyl phosphite was employed for comparison purposes.

*Table 1*

| Nature of stabiliser | Quantity used per 200 parts by weight of 1,4-cis-polyisoprene | Limiting viscosity | |
|---|---|---|---|
| | | Before mastication | After mastication |
| $P\left(-O-C_2H_4-N(CH_3)-C_6H_5\right)_3$ | 8 | 9.50 | 3.53 |
| $P\left(-O-C_2H_4-O-C_6H_3(CH_3)_2\right)_3$ | 4 | 5.70 | 3.02 |
| $P(-O-C_2H_4-O-C_6H_4-C_{12}H_{25})_3$ | 5 | 5.45 | 2.93 |
| $P(-O-C_2H_4-O-C_6H_4-CH_3)_3$ | 7 | 4.90 | 3.00 |
| $P(O-C_6H_4-C_9H_{19})_3$ (for comparison) | 7 | 5.85 | 1.95 | oxygen and ozone), heat and light and also protect the synthetic rubber or chlorine-containing polymers against discolouration. At the same time they do not interfere with the processing of the polymers and are compatible with additives, such as plasticisers and fillers. They can be used for the stabilization of a very wide range of synthetic rubbers and chlorine-containing polymers as will be apparent from the following examples.

EXAMPLE 1

150 parts by weight of 1,4-cis-polyisoprene, which had been prepared with the use of an organometallic catalyst, were thoroughly mixed in a kneader with 2500 parts by weight of cyclohexane and with 4.5 parts by weight of a compound of the formula

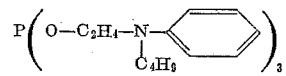

as stabilizer. The resulting mixture was thoroughly washed with cold water on a roller in order to destroy the residues of catalyst. The mixture was then dried in vacuo at 50° C.

For comparison purposes, 150 parts by weight of 1,4-cispolyisoprene were treated in the same manner but without the adidtion of the stabilizer.

The two specimens were kept in air for 20 days. At the end of this period of time the comparison specimen had become tacky and had started to deliquesce. The specimen which had been treated with the stabilizing agent, on the other hand, was unchanged.

EXAMPLE 2

Five solutions each containing 200 parts by weight of 2,4-cis-polyisoprene were respectively mixed with 10 parts by weight of isopropanol and with the specified amounts of the stabilizer additives indicated in the following Table 1. The resulting mixtures were washed with cold water on a roller and then dried in vacuo at 50° C. The resulting products were masticated for 10 minutes with an unstabilized comparison specimen of 1,4-cis-polyisoprene on a mixing roller at 45° C. under the same conditions. The degradation which occurred was determined by establishing the limiting viscosity of the initial material and of the masticated specimen. The

EXAMPLE 3

350 parts by weight of a polymerization product consisting of 100 parts by weight of 1,4-cis-polyisoprene in 250 parts by weight of n-hexane were mixed in a kneader with 3 parts by weight of stearic acid and with 2.5 parts by weight of the compound.

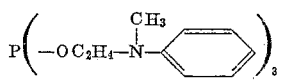

The resulting product was dried in vacuo at 50° C. The resulting polymer had a limiting viscosity of $[\eta]=6.36$.

100 parts by weight of the product thus obtained were mixed on a roller in the usual manner with 30 parts by weight of inactivated carbon black,
1 part by weight of stearic acid,
5 parts by weight of zinc oxide,
2 parts by weight of phenyl-α-naphthylamine,
0.6 part by weight of paraffin,
2.5 parts by weight of sulphur,
0.5 part by weight of dibenzthiazyl disulphide; and
0.2 part by weight of diphenyl guanidine.

The polymer very quickly assumed the form of a smooth sheet and showed good absorption of filler. After the mixing operation, the limiting viscosity of the polymer was $[\eta]=4.20$. After vulcanization at 141° C. the product showed the following mechanical properties:

Strength, 147 kg./cm.$^2$; elongation, 730%; elasticity at room temperature, 64%; elasticity at 75° C., 72%.

EXAMPLE 4

100 parts by weight of each of the new stabilizers indicated in Table 2 were respectively added to five separate batches each containing 500 parts by weight of a chloroprene polymer on a roller and the mixtures were thoroughly worked. The chloroprene polymer was not sulphur-modified and had been prepared from chloroprene in the normal manner with the addition of phenthiazine as stabilizer. The resulting products were stored at 70° C. in order to check the tendenecy to cyclization and the plasticity of the products prior to ageing was compared with the plasticity after ageing. As regards the values indicated in Table 2 the first figure is the Defo hardness and the second figure the Defo elasticity.

Table 2

| Additive | Defo values at 80° C. after— | | |
|---|---|---|---|
| | 0 days | 6 days | 9 days |
| None | 250/11 | 350/13 | 450/17 |
| $P(\text{—O—}C_2H_4\text{—N}(CH_3)\text{—}C_6H_5)_3$ | 220/7 | 260/9 | 280/9 |
| $P(\text{—O—}C_2H_4\text{—N}(C_4H_9)\text{—}C_6H_5)_3$ | 190/6 | 250/8 | 380/10 |
| $P(\text{—O—}C_2H_4\text{—O—}C_6H_3(CH_3)_2)_3$ | 210/8 | 290/10 | 360/12 |
| $P(\text{-O-}C_2H_4\text{-O-}C_6H_4\text{-}C(CH_3)_3)_3$ | 200/7 | 300/10 | 330/14 |
| $P(\text{-O-}C_3H_6\text{-O-}C_6H_4\text{-}C(CH_3)_3)_3$ | 180/4 | 270/9 | 350/14 |

EXAMPLE 5

2% by weight by each of the stabilizers specified in Table 2 was respectively added to five batches of polychloroprene latex prior to the working up of the latex. The amount of stabilizer added was based on the weight of solid polychloroprene. The polymer was worked up, dried and subjected to the test described in Example 4. The same results were obtained as in Example 4. This shows that the washing of the rubber sheet during working up does not affect the efficacy of the products.

EXAMPLE 6

The stabilizers employed in Examples 4 and 5 result in a distinct brightening when a polychloroprene polymer containing the known stabilizer phenthiazine (which discolours the polymer) is exposed to light. The test was carried out with the following mixture:

100 parts by weight of polychloroprene,
30 parts by weight of titanium dioxide,
0.5 part by weight of stearic acid,
4 parts by weight of magnesium oxide,
5 parts by weight of zinc oxide,
0.7 part by weight of ethylene thiourea.

On exposure with a xenon lamp, the following results were obtained:

EXAMPLE 7

Each of the substances indicated below was respectively admixed on a roller heated to 160° C. with 100 parts by weight of a polyvinyl chloride polymer having a K-value of 70 and which had been produced by emulsion polymerization.

Specimens of the sheets obtained after rolling for 25 minutes were stored in a chamber heated to 170° C. and through which air was circulated.

1.0 part by weight of each of the following phosphites were admixed with the polyvinyl chloride polymer in each case:

(a) $P(O\text{—}C_2H_4\text{—}O\text{—}C_6H_4\text{—}C_4H_9 \text{ tert.-p})_3$
(b) $P(O\text{—}C_2H_4\text{—}NH\text{—}C_6H_5)_3$
(c) $P(O\text{—}C_2H_4\text{—}N(CH_3)\text{—}C_6H_5)_3$
(d) $P(\text{—}O\text{—}C_6H_4\text{—}C_4H_9 \text{ tert.-p})$
    $(O\text{—}C_2H_4\text{—}NH\text{—}C_6H_5)_2$
(e) $P(\text{—}O\text{—}C_6H_4\text{—}C_4H_9 \text{ tert.-p})$
    $(O\text{—}C_2H_4\text{—}N(CH_3)C_6H_5)_2$
(f) $P(\text{—}O\text{—}C_6H_4\text{—}C_4H_9 \text{ tert.-p})$
    $(O\text{—}C_2H_4\text{—}N(C_4H_9n)C_6H_5)_2$
(g) $P(\text{—}O\text{—}C_6H_4\text{—}C_4H_9 \text{ tert.-p})$
    $(\text{—}O\text{—}C_2H_4\text{—})_2 N\text{—}C_6H_5$
(h) $(C_3H_7)_2NP(\text{—}O\text{—}C_2H_4\text{—}NH\text{—}C_6H_5)_2$
(i) 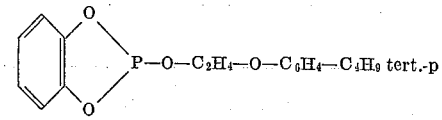
(j) $P(\text{—}O\text{—}C_2H_4\text{—}C_6H_4\text{—}C_4H_9 \text{ tert.-p})$
    $(\text{—}O\text{—}C_2H_4\text{—}NH\text{—}C_6H_5)_2$
(k) $(C_3H_7)_2NP(\text{—}O\text{—}C_2H_4\text{—}O\text{—}C_2H_4\text{—}NHC_6H_5)_2$
($k_1$) $P(\text{—}O\text{—}C_2H_4\text{—}O\text{—}C_2H_4\text{—}O\text{—}C_2H_4\text{—}O\text{—}C_6H_4\text{—}C_4H_9 \text{ tert.})_3$ The following compounds were used for comparison purposes:

(l) $P(S\text{—}C_{12}H_{25}n)_3$
(m) $P(O\text{—}C_6H_4\text{—}C_9H_{19}\text{—}p)_3$
(n) $N(C_2H_4\text{—}O\text{—}P(O\text{—}C_6H_5)_2)_3$
(o) No additive

*Result.*—The specimen (o) to which no stabilizer had been added become dark brown to black in colour after having been stored for only 15 minutes in the heated chamber. The specimens (l)–(n) to each of which one of the comparison substances had been added also became dark brown to black in colour after 30 minutes in the heated chamber. The specimens (a)–($k_1$) to each of which one of the novel phosphites had been added only showed a yellowish to yellow colour tone after 30 minutes in the heated chamber, the colour changing to a Table 3

| Additive | Discolouration after exposure for— | | | |
|---|---|---|---|---|
| | 0 hour | 20 hours | 40 hours | 60 hours |
| none | None | Weak | Strong | Very strong. |
| $P(\text{—O—}C_2H_4\text{—N}(C_4H_9)\text{—}C_6H_5)_3$ | do | None | None | Weak. |
| $P(\text{—O—}C_2H_4\text{—O—}C_6H_3(CH_3)_2)_3$ | do | do | Weak | Do. |
| $P(\text{—O—}C_3H_6\text{—O—}C_6H_4\text{—}C(CH_3)_3)_3$ | do | Weak | do | Strong. | dark brown only after another 30–60 minutes in the chamber.

The compound recited under heading (c) was prepared as follows:

13.5 g. of phosphorus trichloride dissolved in 50 ml. of benzene were introduced dropwise and while stirring into a solution of 45.5 g. of N-methyl-N-β-hydroxyethylaniline in 250 ml. of benzene, to which 33 g. of triethylamine had been added. The strongly exothermic reaction was moderated by cooling the reaction mixture with iced water. The reaction mixture was stirred for approximately 1 hour at a temperature of from 60° C. to 70° C. The product was then cooled to room temperature and the precipitated triethyl ammonium chloride filtered off with suction. The filtrate was concentrated by evaporation in vacuo. A light yellow clear viscous oil was left.

*Analysis.*—Calculated for $C_{27}H_{36}O_3N_3P$: C, 67.4%; H, 7.5%; N, 8.7%; P, 6.4%. Found: C, 67.4%; H, 7.4%; N, 8.6%; P, 6.2%.

The compound recited under heating (a) was obtained in a corresponding manner as follows:

A solution of 13.7 g. of phosphorus trichloride in 50 ml. of benzene was introduced dropwise and while stirring into a solution of 58.2 g. of β-hydroxyethyl-4-tert.-butylphenyl-ether and 33 g. of triethylamine in 500 ml. of benzene. The reaction temperature was kept below +35° C. by cooling the reaction mixture with iced water. The reaction mixture was stirred for 1½ hours at a temperature of from 30° C. to 40° C. The precipitated triethyl ammonium chloride was filtered off with suction at room temperature and the filtrate was concentrated by evaporation in vacuo. A viscous light yellow oil was obtained, which was suction filtered through a frit until clear.

*Analysis.*—Calculated for $C_{36}H_{51}O_6P$: C, 70.8%; H, 8.4%; P, 5.1%. Found: C, 70.9%; H, 8.4%; P. 4.9%.

The products indicated in the following table can be prepared in a corresponding manner by reacting an hydroxyalkylated phenol or amine with $PCl_3$ or with a phosphorus acid ester chloride or amide, using a tertiary amine for combining with the hydrochloric acid which is liberated:

| | Phosphorous acid halide | Hydroxyalkylated phenol or amine | Molar ratio between phosphorous acid halide/hydroxy alkylated phenol or amine | Final product |
|---|---|---|---|---|
| (1) | $PCl_3$ | $HO-C_2H_4-NH-C_6H_5$ | 1/3 | $P(-O-C_2H_4-NH-C_6H_5)_3$ |
| (2) | $PCl_3$ | $HO-C_2H_4-O-C_6H_4-CH_3$ | 1/3 | $P(-O-C_2H_4-O-C_6H_4-CH_3)_3$ |
| (3) | $PCl_3$ | $HO-C_2H_4-O-C_6H_3(CH_3)_2$ (2,4-dimethyl) | 1/3 | $P(-O-C_2H_4-O-C_6H_3(CH_3)_2)_3$ |
| (4) | $PCl_3$ | $HO-C_2H_4-O-C_6H_4-CH_2-C_6H_5$ | 1/3 | $P(-O-C_2H_4-O-C_6H_4-CH_2-C_6H_5)_3$ |
| (5) | $PCl_3$ | $HO-C_3H_7-O-C_6H_4-CH_2-C_6H_5$ | 1/3 | $P(-O-C_3H_7-O-C_6H_4-CH_2-C_6H_5)_3$ |
| (6) | $PCl_3$ | $HO-C_3H_7-CH(C_6H_5)_2$ | 1/3 | $P(-O-C_3H_7-CH(C_6H_5)_2)_3$ |
| (7) | $PCl_3$ | $HO-C_2H_4-O-C_6H_4-C(CH_3)_3$ | 1/3 | $P(-O-C_2H_4-O-C_6H_4-C(CH_3)_3)_3$ |
| (8) | $PCl_3$ | $HO-C_3H_7-O-C_6H_4-C(CH_3)_3$ | 1/3 | $P(-O-C_3H_7-O-C_6H_4-C(CH_3)_3)_3$ |

| | Consistency of final product | Analysis of final product | | | | | | | |
|---|---|---|---|---|---|---|---|---|---|
| | | Found | | | | Calculated | | | |
| | | Percent C | Percent H | Percent P | Percent N | Percent C | Percent H | Percent P | Percent N |
| (1) | Light yellow oil | | | 6.9 | 9.4 | | | 7.1 | 9.6 |
| (2) | Yellowish oil | 67.3 | 7.0 | 5.9 | | 67.0 | 6.8 | 6.3 | |
| (3) | Colourless oil | 68.2 | 7.4 | 5.7 | | 68.4 | 7.4 | 5.9 | |
| (4) | Colourless oil | 75.5 | 6.3 | 4.3 | | 75.8 | 6.3 | 4.4 | |
| (5) | Light brown oil | 76.5 | 6.8 | 3.9 | | 76.7 | 6.8 | 4.1 | |
| (6) | Yellowish oil | 76.1 | 6.5 | 4.1 | | 75.9 | 6.3 | 4.4 | |
| (7) | Colourless oil | 70.9 | 8.4 | 4.9 | | 70.8 | 8.4 | 5.1 | |
| (8) | Colourless wax | 71.1 | 8.6 | 5.2 | | 71.8 | 8.8 | 4.8 | |

| Phosphorous acid halide | Hydroxyalkylated phenol or amine | Molar ratio between phosphorous acid halide/hydroxy alkylated phenol or amine | Final product |
|---|---|---|---|
| (9) PCl₃ | HO-C₂H₄-N(C₆H₅)-CH₃ | 1/3 | P(-O-C₂H₄-N(C₆H₅)-CH₃)₃ |
| (10) PCl₃ | HO-C₂H₄-N(C₆H₅)-C₄H₉ | 1/3 | P(-O-C₂H₄-N(C₆H₅)-C₄H₉)₃ |
| (11) PCl₃ | HO-C₂H₄-O-C₂H₄-NH-C₆H₅ | 1/3 | P(-O-C₂H₄-O-C₂H₄-NH-C₆H₅)₃ |
| (12) PCl₃ | HO-(C₂H₄-O)₂-C₂H₄-O-C₆H₄-C(CH₃)₃ | 1/3 | P(-O-[C₂H₄-O-]₃-C₆H₄-C(CH₃)₃)₃ |
| (13) PCl₃ | { HO-C₂H₄-O-C₆H₄-C(CH₃)₃ ; HO-C₂H₄-NH-C₆H₅ } | 1/1/2 | (CH₃)₃C-C₆H₄-OC₂H₄OP(OC₂H₄NH-C₆H₅)₂ |
| (14) (CH₃)₃C-C₆H₄-O-PCl₂ | HO-C₂H₄-N(C₆H₅)-CH₃ | 1/2 | (CH₃)₃C-C₆H₄-O-P(OC₂H₄-N(C₆H₅)-CH₃)₂ |

| Consistency of final product | Analysis of final product | | | | | | | |
|---|---|---|---|---|---|---|---|---|
| | Found | | | | Calculated | | | |
| | Percent C | Percent H | Percent P | Percent N | Percent C | Percent H | Percent P | Percent N |
| (9) Light yellow oil | 67.4 | 7.4 | 5.9 | 8.6 | 67.4 | 7.5 | 6.4 | 8.7 |
| (10) Light yellow oil | 71.0 | 8.6 | 5.2 | 7.4 | 71.1 | 8.9 | 5.1 | 6.9 |
| (11) Colourless oil | | | 5.2 | 7.8 | | | 5.4 | 7.4 |
| (12) Colourless oil | | | 3.8 | | | | 3.5 | |
| (13) Light yellow oil | | | 6.0 | 5.6 | | | 6.3 | 5.7 |
| (14) Light yellow oil | | | 6.5 | 6.1 | | | 6.5 | 5.8 |

| Phosphorous acid halide | Hydroxyalkylated phenol or amine | Molar ratio between phosphorus acid halide/hydroxy alkylated phenol or amine | Final product |
|---|---|---|---|
| (15) (CH₃)₃C-C₆H₄-O-PCl₂ | HO-C₂H₄-NH-C₆H₅ | 1/2 | (CH₃)₃C-C₆H₄-O-P(OC₂H₄-NH-C₆H₅)₂ |
| (16) (CH₃)₃C-C₆H₄-O-PCl₂ | HO-C₂H₄-N(C₆H₅)-C₄H₉ | 1/2 | (CH₃)₃C-C₆H₄-O-P(OC₂H₄-N(C₆H₅)-C₄H₉)₂ |
| (17) ((CH₃)₃C-C₆H₄-O-)₂PCl | HO-C₂H₄-N(C₆H₅)-C₄H₉ | 1/1 | ((CH₃)₃C-C₆H₄-O-)₂P-O-C₂H₄-N(C₆H₅)-C₄H₉ |
| (18) benzo[1,3,2]dioxaphosphole-PCl | HO-C₂H₄-O-C₆H₄-C(CH₃)₃ | 1/1 | benzo[1,3,2]dioxaphosphole-P-O-C₂H₄-O-C₆H₄-C(CH₃)₃ |

| Consistency of final product | Analysis of final product | | | | | | | |
|---|---|---|---|---|---|---|---|---|
| | Found | | | | Calculated | | | |
| | Percent C | Percent H | Percent P | Percent N | Percent C | Percent H | Percent P | Percent N |
| (15) Yellowish oil | | | 6.9 | 6.5 | | | 6.9 | 6.2 |
| (16) Colourless oil | | | 5.5 | 5.2 | | | 5.5 | 5.0 |
| (17) Colourless oil | | | 6.3 | 3.1 | | | 5.9 | 2.7 |
| (18) Light yellow oil | | | 9.2 | | | | 9.3 | |

| Phosphorous acid halide | Hydroxyalkylated phenol or amine | Molar ratio between phosphorous acid halide/hydroxyalkylated phenol or amine | Final product |
|---|---|---|---|
| (19) 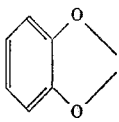 | HO—C₂H₄—N(—C₆H₅)(CH₃) | 1/1 | 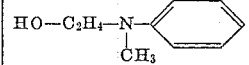 |
| (20) (n—C₃H₇)₂N—PCl₂ | HO—C₂H₄—NH—C₆H₅ | 1/2 | (n—C₃H₇)₂N—P(O—C₂H₄—NH—C₆H₅)₂ |
| (21) (n—C₃H₇)₂N—PCl₂ | HO—C₂H₄—N(—C₆H₅)(CH₃) | 1/2 | (n—C₃H₇)₂N—P(O—C₂H₄—N(—C₆H₅)(CH₃))₂ |

| Consistency of final product | Analysis of final product | | | | | | | |
|---|---|---|---|---|---|---|---|---|
| | Found | | | | Calculated | | | |
| | Percent C | Percent H | Percent P | Percent N | Percent C | Percent H | Percent P | Percent N |
| (19) Colourless oil | | | 10.7 | 5.1 | | | 10.7 | 4.9 |
| (20) Colourless oil | | | 7.9 | 9.9 | | | 7.7 | 10.4 |
| (21) Light yellow oil | | | 7.3 | 9.4 | | | 7.0 | 9.5 |

EXAMPLE 8

The substances indicated below were mixed on a roller heated to 165° C. with 100 parts by weight in each case of a polyvinyl chloride polymer having a K-value of 70 and which had been prepared by suspension polymerisation. Specimens of the sheets obtained were tested as described in Example 7.

2.0 parts by weight of each of the aforementioned phosphites (b), (c), (f) and (h) were added to the polyvinyl chloride polymer in each case. The formulae of these phosphites are given in Example 7.

The aforementioned compounds (l), (m) and (n) and also a specimen without any stabilizer (o) were used for purposes of comparison.

*Results.*—The specimens to which the comparison substances had been added and the specimen without a stabilizer (l–o), became fairly dark in colour after only 5 to 10 minutes on the roller. They showed a strong tendency to tackiness and could not be further processed. The specimens to which the phosphites (b), (c), (f) and (h) had been added, on the other hand, could be rolled satisfactorily. The colourless to slightly yellowish rolled sheets became dark brown in colour only after being kept for 45 minutes in a heated chamber.

EXAMPLE 9

60 parts by weight of a polyvinyl chloride polymer having a K-value of 70 and which had been produced by emulsion polymerisation and 40 parts by weight of an alkyl sulphonic acid ester of a phenol-cresol mixture were rolled for 25 minutes at 160° C. with each of the phosphites hereinafter referred to. The resulting sheets were tested as described in Example 7.

In each case, 0.6 part by weight of the phosphites (b) and (h) was added. The formulae of these phosphites is given in Example 7.

For comparison purposes a specimen without stabilizer (o) was used.

*Result.*—The unstabilized specimen (o) became brownish in colour after only a short rolling time (10 minutes), whereas the specimens stabilized with the phosphites (b) and (h) were colorless and completely clear after the rolling operation. These latter foils showed only a light yellow coloring after being kept at 160° C. for 60 minutes.

EXAMPLE 10

60 parts by weight in each case of a polyvinyl chloride polymer prepared by emulsion polymerisation and having a K-value of 70 and 40 parts by weight of dioctyl phthalate were rolled for 25 minutes at 160° C. with each of the substances indicated below. The resulting sheets were tested as described in Example 7.

0.6 part by weight of each of the phosphites (b) and (h) was employed. The formulae of these phosphites are given in Example 7.

For comparison purposes a specimen without stabilizer (o) was used.

*Result.*—The unstabilized specimen (o) showed a deep brown coloring after being kept for 45 minutes in a hot chamber, whereas the foils stabilized with the substances (b) and (h) were colorless to slightly yellow after this time.

EXAMPLE 11

100 parts by weight in each case of a polyvinyl chloride polymer prepared by emulsion polymerisation and having a K-value of 70 were mixed with each of the substances indicated below on a roller heated to 160° C.

After rolling for 10 minutes the specimens obtained were exposed to light for 100 hours using a Xenon high-pressure lamp ("Xnotest"-apparatus, Original Hanau).

1.0 part by weight of each of the following phosphites (a) and (b) was employed.

(a) P(O—C₂H₄—O—C₆H₄—C₄H₉ tert. p)₃
(b) P(O—C₂H₄—O—C₆H₄—CH₃—p)₃
(c) Without additive.

*Result.*—The specimens to which the substances (a) and (b) had been added showed only a slight yellow coloring, whereas the specimen (c) was dark brown in color.

We claim:
1. A polymer selected from the group consisting of (a) homopolymers of conjugated diolefins, (b) copolymers of conjugated diolefins and polymerizable vinyl monomers, (c) homopolymers of chlorobutadiene, (d) copolymers of chlorobutadiene with a member selected from the group consisting of a monoolefin, a diolefin, vinyl chloride and vinylidene chloride, (e) polyvinyl chloride, (f) polyvinylidene chloride, (g) copolymers of vinyl acetate with a member selected from the group consisting of vinyl chloride and vinylidene chloride, (h) chlorinated natural rubber, and (i) sulfochlorinated polyethylene, the aforesaid polymer being stabilized by the inclusion therein of 0.5–5% by weight based on the weight of the polymer of a phosphorus acid ester of the formula:

wherein R and R₁ each represent a member selected from the group consisting of an alkyl radical containing up to 12 carbon atoms, phenyl, and an alkyl-phenyl radical which is joined to the phosphorous atom through a member selected from the group consisting of an oxygen and a nitrogen atom, with not more than one nitrogen atom being attached to the phosphorous atom, and wherein R, R₁ and R₂ further represent radicals of the formula:

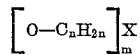

wherein $n$ is an integer from 1 to 4, $m$ is an integer from 1 to 3 and X represents a member selected from the group consisting of

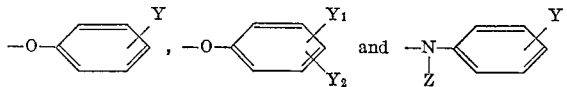

wherein Y represents a member selected from the group consisting of an alkyl radical of up to 12 carbon atoms, phenyl, alkyl phenyl, and aralkyl radicals, Y₁ and Y₂ each represent an alkyl radical of up to 12 carbon atoms, and wherein Z represents a member selected from the group consisting of a hydrogen atom, a lower alkyl, cyclohexyl, aryl, alkaryl, and aralkyl radicals.

2. The composition of claim 1 wherein said stabilizer is

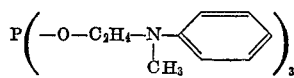

3. The composition of claim 1 wherein said stabilizer is

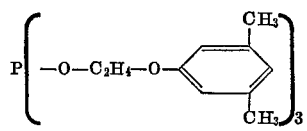

4. The composition of claim 1 wherein said stabilizer is

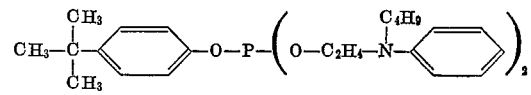

5. Polyisoprene stabilized with 0.5–5% by weight of

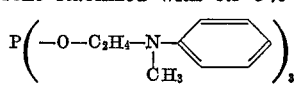

6. Polyvinyl chloride stabilized with 0.5–5% by weight of

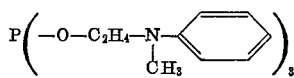

7. The composition of claim 1 wherein said polymer is polyisoprene.

8. The composition of claim 1 wherein said polymer is polyvinyl chloride.

9. The composition of claim 1 wherein said polymer is polychloroprene.

10. A compound of the formula

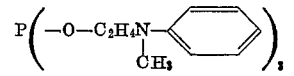

11. A compound of the formula

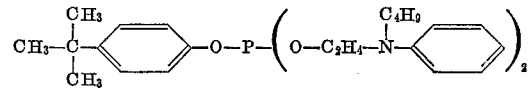

References Cited in the file of this patent
UNITED STATES PATENTS

| | | |
|---|---|---|
| 2,230,543 | Mikesku | Feb. 4, 1941 |
| 2,877,259 | Bill | Mar. 10, 1959 |
| 2,928,861 | Short | Mar. 15, 1960 |
| 2,951,052 | Darby | Aug. 30, 1960 |
| 3,047,608 | Friedman | July 31, 1962 |
| 3,061,583 | Huhn et al. | Oct. 30, 1962 |

OTHER REFERENCES

Farbenind: Chem. Abstracts, vol. 25, No. 13, July 10, 1931, page 3667.

Abramov et al.: Chem. Abstracts, vol. 44, No. 13, July 10, 1950, page 5800 *b–c*.